United States Patent Office 3,423,311
Patented Jan. 21, 1969

3,423,311
PROCESS FOR OBTAINING COMPLETE SOFTENING OF WATERS WHERE HARDNESS EXCEEDS ALKALINITY
Richard Hetherington, Glenside, Pa., and Joseph Foley, Wilmington, Del., said Hetherington assignor to Rohm & Haas Company, Philadelphia, Pa., a corporation of of Delaware, and said Foley assignor to E. I. du Pont de Nemours and Company, Wilmington, Del., a corporation of Delaware
No Drawing. Filed Mar. 29, 1966, Ser. No. 538,251
U.S. Cl. 210—38        6 Claims
Int. Cl. C02b 1/42

This invention relates to a method for dealkalizing and softening hard water by means of cation exchange resins. More particularly, it has reference to a method for dealkalizing and completely softening water in which the total quantity of ions causing hardness exceeds the total quantity of ions responsible for the alkalinity of the water.

In treating waters containing hardness and alkalinity it is common practice to use two stationary beds or columns of strongly acidic cation exchange resin, utilizing one bed of resin in the sodium form and one bed in the hydrogen form. The two columns are placed in parallel, and by passing a portion of the water through each column all of the calcium and magnesium hardness ions are replaced either by sodium or hydrogen ions. By regulating the relative flow through the two columns and combining the effluents, there is present sufficient hydrogen ions to be exactly chemically equivalent to all of the alkalinity in the original water supply. Degasification to remove the resulting carbon dioxide leaves the water completely free of hardness ions and free of alkalinity.

The above technique has the disadvantage of requiring adjustment of the relative flows of water through the two columns whenever the ratio of cations and of anions in the influent water supply changes. This system is complicated also in requiring two different regenerant chemicals, namely, acid for regeneration of the resin in the one column and a sodium salt for regeneration of the resin in the other column.

Alternative to the use of the strongly acidic cation exchange resins, a single column of a weakly acidic cation exchanger, normally a carboxylic resin in the hydrogen form, can be utilized. A weakly acidic cation exchange resin is one which, as a rule, will not to an appreciable extent exchange metallic ions which are associated with strong mineral acid anions, but will exchange cations associated with bicarbonate, carbonate or hydroxide ions. A commercially available example of such a resin is Amberlite IRC–84 (H+). However, even such preferred resins have the limitation that they can only remove that quantity of hardness-causing calcium or magnesium ions which is equivalent to or less than the quantity of ions present, namely bicarbonate, hydroxide or carbonate ions, which are responsible for the water's alkalinity. If it happens that the total of hardness-causing ions present should exceed the quantity of alkalinity-causing ions in the water, the customary practice has been to send the effluent from the weakly acid resin column down thru a column or bed of a strongly acidic resin such as Amberlite IR–120, a commercially available sulfonic acid resin, in the sodium form.

The only function of this second ion exchanging unit is to remove the hardness-causing ions which are present in excess of the total of alkalinity-causing ions. It is not effective in removing the alkalinity-causing ions, and it does not provide any other benefits. On the other hand, it greatly increases the initial cost of operation since additional equipment must be provided, and it contributes to a much increased operating cost in terms of the additional resin and regenerants therefor which must be employed, and also in terms of the additional space and other facilities which must be provided to house and care for the unit. In view of these factors, it can readily be seen that a need has existed for a method of removing all the hardness-causing ions, even in cases where those ions are in excess of the alkalinity-causing ions, without requiring the use of the second ion exchanging unit containing strongly acid cation-exchange resins.

Our present invention very satisfactorily fulfills that need by means of a simplified method which consists in adding to the water being treated, prior to its passage through the weakly acidic cation exchange unit, an amount of alkalinity-causing ions which is at least equal to the quantitative difference between the alkalinity-causing and hardness-causing ions in the water. The alkalinity-causing ions can be supplied by addition of the soluble bicarbonate, carbonate or hydroxide of a monovalent cation such as sodium, potassium, lithium or ammonium, with sodium being the preferred one.

The use of salts such as sodium hydroxide or sodium carbonate would be limited by the nature of the particular water to be treated. If, for example, the water was high in magnesium, sodium hydroxide preferably should not be used since magnesium hydroxide would be precipitated out, and this could cause operational problems as the deposits build up and foul the water lines. Likewise, if the water was high in calcium, the use of sodium carbonate would not be advisable because calcium carbonate would precipitate. On the other hand, sodium bicarbonate could be used at all times regardless of the composition of the water as no such undesirable precipitation would occur.

Following are examples which illustrate the nature of the present invention. In each example the composition of the water is different from each of the others, but collectively they represent the three different types of waters which have to be considered in water softening problems the world over. In each case, it should be understood, the reference to "p.p.m." is to parts per million as calcium carbonate. This is in accordance with customary practice in the water conditioning industry in which all quantitative references, whether dealing with hardness-causing ions or alkalinity-causing ions, are expressed in terms of their chemical equivalents to calcium carbonate. Thus, the total hardness of a water, which is caused by the combined concentrations of its calcium and magnesium salts, is expressed as p.p.m. $CaCO_3$. Likewise, the alkalinity value for a water containing bicarbonate ions, for example, is determined by dividing the equivalent weight of calcium carbonate by the equivalent weight of the bicarbonate ion, and multiplying the answer by the concentration of bicarbonate ions to give the total of alkalinity-causing bicarbonate ions in terms of p.p.m. as $CaCO_3$.

Example 1

A sample of raw water is employed which has the following composition (each component in p.p.m. as $CaCO_3$):

| Calcium | 150 | Bicarbonates | 110 |
|---|---|---|---|
| Magnesium | 80 | Sulfates | 50 |
| Sodium | 10 | Chlorides | 80 |
| Total cations | 240 | Total anions | 240 |

The total hardness concentration thus is 230 p.p.m., and the difference between that value and the value for the bicarbonate concentration is 120 p.p.m. In this case it is recognized that, because of the relatively high amounts of calcium and magnesium ions present, neither a carbonate nor a hydroxide salt should be used. Above a feed of about 12 p.p.m. of sodium carbonate, calcium carbonate would precipitate out. Likewise, at a feed of about 15 p.p.m. of sodium hydroxide there would be precipitation of magnesium hydroxide. Therefore, 120 p.p.m. of sodium bicarbonate has to be the feed of choice.

(a) Conventional method

By way of comparison, the conventional method of treating this sample of water is first employed. The water is first passed through Amberlite IRC–84 (H+). The resin is rated at an exchange capacity of 58 kg. as $CaCO_3$ when regenerated with 9.4 pounds of 66° Be′ sulfuric acid per cubic foot. After this treatment the composition of the water is as follows:

|  | P.P.M. |
| --- | --- |
| Carbonic acid | 110 |
| Hardness | 120 |
| Sodium | 10 |
| Sulfates | 50 |
| Chlorides | 80 |

This water is then passed through a unit of Amberlite IR–120 (Na+). This resin is rated at an exchange capacity of 22 kg./cu. ft. when regenerated with six pounds NaCl/cu. ft. After this treatment the composition of the water is as follows:

|  | P.P.M. |
| --- | --- |
| Carbonic acid | 110 |
| Sodium | 130 |
| Sulfates | 50 |
| Chlorides | 80 |

Next, the water is passed through a degasifier, after which its composition is as follows:

|  | P.P.M. |
| --- | --- |
| Carbonic acid | 5–10 |
| Sodium | 130 |
| Sulfates | 50 |
| Chlorides | 80 |

(b) New method

To the sample of raw water is added 120 p.p.m. of sodium bicarbonate prior to passing the water through the Amberlite IRC–84 unit (having the identical exchange capacity as the comparable unit used in the conventional method above). The effluent has the following composition:

|  | P.P.M. |
| --- | --- |
| Carbonic acid | 230 |
| Sodium | 130 |
| Sulfates | 50 |
| Chlorides | 80 |

Next, this water is passed through a degasifier which, incidentally, works strictly on the basis of the gallons per minute being treated, and not on the amount of carbonic acid being removed. Therefore, the higher concentration of carbonic acid is removed at no additional expense. The degasified effluent's composition is as follows:

|  | P.P.M. |
| --- | --- |
| Carbonic acid | 5–10 |
| Sodium | 130 |
| Sulfates | 50 |
| Chlorides | 80 |

As will be noted, the resulting water is essentially identical with that obtained by the conventional method described above. However, the advantage in the new technique lies in the fact that it achieved the same result without the expense of a unit containing a sulfonic acid cation exchange resin such as Amberlite IR–120 (Na+). The addition of sodium bicarbonate to the raw water represents a comparatively negligible cost in comparison with the cost of a second cation exchanging unit, the cost of the resin in that unit, and the cost of regenerants for that resin.

Example 2

A sample of raw water is employed which has the following composition (each component in p.p.m. as $CaCO_3$):

| | | | |
| --- | --- | --- | --- |
| Calcium | 10 | Bicarbonates | 80 |
| Magnesium | 80 | Sulfates | 40 |
| Sodium | 50 | Chlorides | 20 |
| Total cations | 140 | Total anions | 140 |

In this water the desired increase of alkalinity-causing ions, in accordance with the present invention, could readily be made with sodium bicarbonate as in Example 1. However, to demonstrate that other alkalinity-causing ions could be added, the bicarbonate is not employed. The alternative choice should not be sodium hydroxide since, above about 15 p.p.m. of sodium hydroxide, magnesium hydroxide will precipitate. But sodium carbonate will work very well, as when fed in an amount of about 30 p.p.m. to the raw water before passing it through the weakly acidic exchanger, Amberlite IRC–84 (H+), since there is not enough calcium to precipitate calcium carbonate. The result is a water product free of hardness with the alkalinity converted to carbonic acid.

Example 3

A sample of raw water is employed which has the following composition (each component in p.p.m. of $CaCO_3$):

| | | | |
| --- | --- | --- | --- |
| Calcium | 100 | Bicarbonates | 80 |
| Magnesium | 8 | Sulfates | 20 |
| Sodium | 40 | Chlorides | 48 |
| Total anions | 148 | Total anions | 148 |

In this water, also, the desired increase of alkalinity-causing ions could readily be made by adding sodium bicarbonate as in Example 1. However, as in Example 2, it is desired to illustrate how other alkalinity-causing ions can be utilized, in this case sodium hydroxide. Accordingly, 28 p.p.m. of sodium hydroxide is added to the raw water before passing it through the Amberlite IRC–84 (H+), this being a "safe" amount as above about 15 p.p.m. of magnesium would be needed to precipitate magnesium hydroxide. Sodium carbonate, incidentally, could not be used in this example as above about 12 p.p.m of it would result in the precipitation of $CaCO_3$.

From the foregoing examples it can be seen that the present invention provides an improved method for softening water in which the total quantity of hardness-causing ions exceeds the total quantity of alkalinity-causing ions in the water. The method is simpler in operation and more economical than prior art techniques, without any diminution of effectiveness in removing hardness-causing ions from water.

We claim:
1. A method for softening hard water by cation exchange, in the case of water whose total quantity of ions causing hardness exceeds the total quantity of ions responsible for the alkalinity of the water, comprising the addition of an alkalinity-causing ion, from the class consisting of the bicarbonate, carbonate and hydroxide of a monovalent cation from the class consisting of sodium, potassium, lithium and ammonium, to the water in an amount which is at least equal to the quantitative difference between the alkalinity-causing and hardness-causing ions present in the water, and then passing the water through a cation exchanging unit consisting of a weekly acidic cation exchange resin in the hydrogen form.

2. The method of claim 1 in which the effluent water from the cation exchanging unit is passed through a degasifying unit to remove carbonic acid.

3. The method of claim 1 in which the monovalent cation is sodium and the alkalinity-causing ion is bicarbonate.

4. The method of claim 1 in which the monovalent cation is sodium and the alkalinity-causing ion is carbonate.

5. The method of claim 1 in which the monovalent cation is sodium and the alkalinity-causing ion is hydroxide.

6. The method of claim 1 in which the weakly acidic cation exchange resin is a carboxylic resin in the hydrogen form.

References Cited

UNITED STATES PATENTS

| | | | |
|---|---|---|---|
| 1,683,967 | 9/1928 | Foster et al. | 210—38 |
| 2,575,518 | 11/1951 | Holmes et al. | 210—38 X |
| 3,156,644 | 11/1964 | Kunin | 210—38 X |

OTHER REFERENCES

McGarvey et al: "Carboxylic Cation Exchange Resin in Water Conditioning," Industrial and Engineering Chemistry, vol. 43, No. 3, March 1951, pp. 741–746.

"Ion Exchange," Chemical Engineering, June 1965, pp. 76–77.

REUBEN FRIEDMAN, *Primary Examiner.*

C. M. DITLOW, *Assistant Examiner.*